June 17, 1958  W. R. DE ARMOND  2,839,723
IMPEDANCE MEASURING DEVICE
Filed Dec. 27, 1954

WILLIAM R. DE ARMOND,
INVENTOR.

By Reed B. Lawlor
ATTORNEY.

2,839,723
IMPEDANCE MEASURING DEVICE

William R. De Armond, Torrance, Calif., assignor to Amelco, Inc., a corporation of California Application December 27, 1954, Serial No. 477,676

1 Claim. (Cl. 324—51)

This invention relates to improvements in electrical resistance measuring devices and more particularly to an improved continuity meter.

It is frequently desirable to have an instrument available which will indicate whether or not electrical continuity exists between two points of an electronic circuit. Such a point may be, for example, an electrical conductor or wire or a solder joint or part of the chassis upon which the parts of the electronic device are mounted. An instrument which is employed for this purpose is called a continuity meter, since it is adapted to indicate whether or not a closed or an open circuit exists between two points of an electronic device or even whether the electrical resistance between such two points is high instead of very low. It is oftentimes desirable, however, to measure impedance as well as resistance in order to detect shorted coils or condensers. Furthermore, in case only a very small resistance or impedance exists between two points, it is desirable to indicate the actual value of the resistance or impedance, so that the person working on the electronic device may make appropriate changes therein.

Accordingly, it is an object of this invention to provide an improved continuity meter which is simple, of relatively low cost, but nevertheless offers a high degree of reliability in the indications obtained.

Another object of the invention is to provide a continuity meter which may be energized simply by plugging into A. C. power or "house main" outlet.

Still another important object is to provide an improved continuity meter which will yield highly accurate indications of small impedances as well as resistances whereby short circuits existing across coils or condensers may be readily detected.

The foregoing and other objects of this invention, together with various advantages thereof, will be apparent from the following specification taken in connection with the accompanying drawing wherein.

Figure 1:
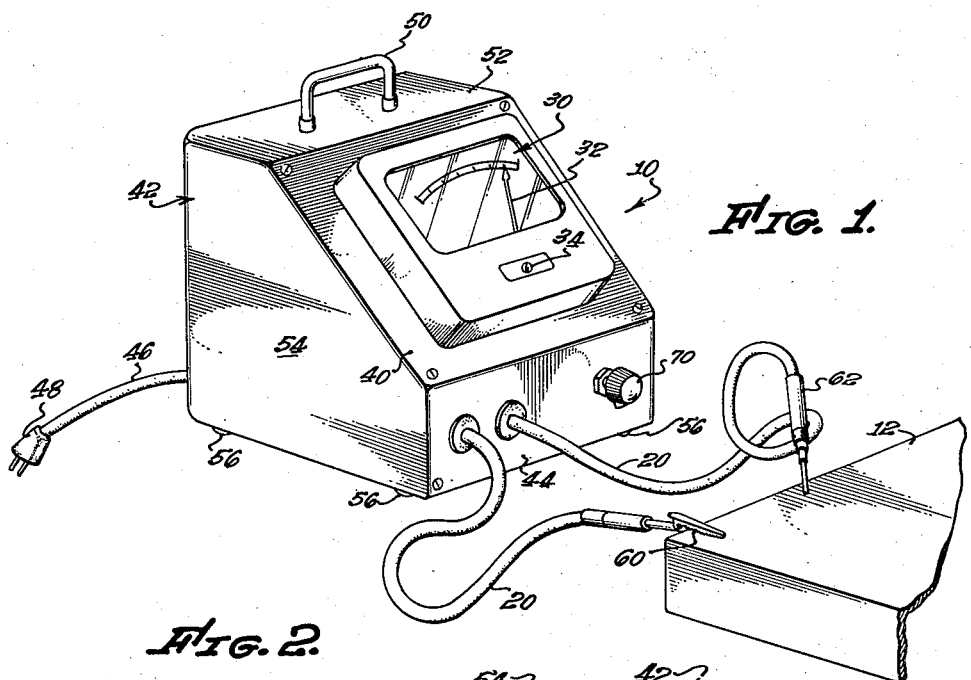
Fig. 1 is a perspective view of a continuity meter embodying the present invention.
Figure 2:
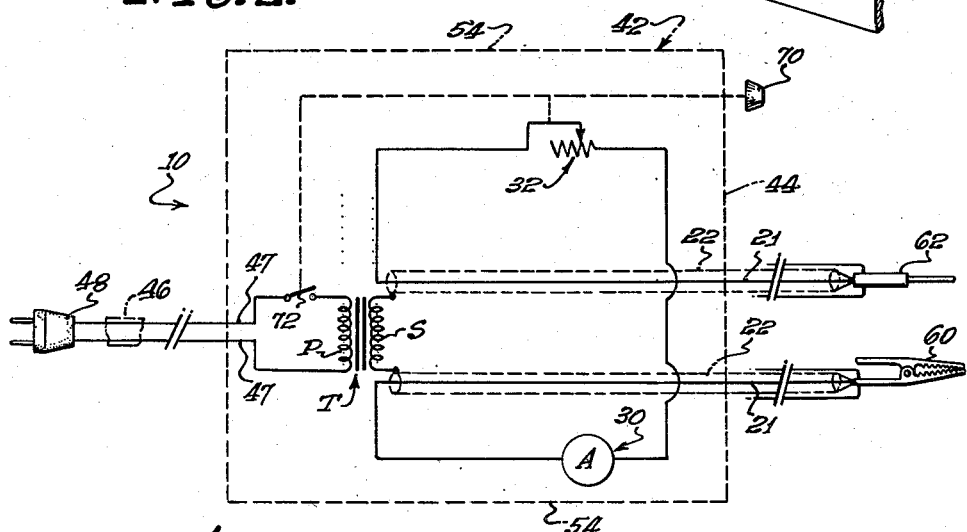
Fig. 2 is a schematic wiring diagram of the continuity meter.

In the drawing, particularly in Figs. 1 and 2, wherein an embodiment of the invention is illustrated, there is shown a continuity meter 10 which includes a pair of test leads, or test cables, 20 adapted for connection to the points of an electronic device to be tested and a meter such as a galvanometer 30 that is employed for indicating the impedance between points of the electronic device to which the test leads are connected. The meter 30 itself is mounted upon an inclined surface 40 of a case 42 and the test leads 20 are attached to the front face 44 of the case 42. A power cable 46 that leads to parts of the continuity meter within the case is provided at its outer end with a plug 48 adapted for insertion in an outlet which supplies electrical power of standard frequency and voltage, such as the 60 cycle per second A. C. power supplied at 115 volts in conventional lighting circuits. The case is provided with a handle 50 on its upper face 52 to facilitate carrying. The case 42 itself is completed by side walls 54 and also a rear wall (not shown) and a floor panel (not shown) from which small rubber feet 56 project.

Figure 3:
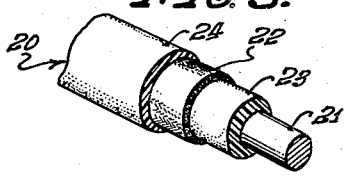
Fig. 3 is a fragmentary perspective view of one of the conductors showing different layers thereof.

In the specific embodiment of the invention illustrated herein each of the test cables 20 is in the form of a shielded cable, such as a cable that is identified by the specification RG–71/U. As shown best in Figure 3, each of the cables 20 comprises two concentric conductors, a central or measuring conductor 21 and an outer or current conductor 22, separated by an annular layer of insulation 23 and an external coating of insulation 24 that is provided to protect the outer conductor 22. The central conductor 21 may be in the form of a single strand of copper wire no smaller than No. 22 American wire guage. The external conductor 22 is a copper-braided shield equivalent to No. 12 American wire guage. Each of the cables may be in the form of a suitable twisted wire pair or two-conductor cable. In any event the current carrying conductors connected directly to the secondary winding are preferably of the multiple-strand type and are of low resistance.

Referring to the circuit diagram of Figure 2, it will be seen that the far ends of the conductors 21 and 22 in each cable are connected together electrically and to a test probe 60 or 62 as the case may be. One of these test probes 60 is in the form of an alligator clip or other fastening or clamping element. The other test probe 62 is in the form of a needle-like member. The alligator clip 60 is adapted to be removably fastened to one point of a circuit, while the other probe 62 is adapted for pressing against another point in the circuit to make electrical connection therewith.

The other ends of each of the outer conductors 22 are connected to the secondary winding S of a transformer T housed within the casing 42. The ends of the primary winding P of the transformer are connected to the conductors 47 of the power cable 46 through a switch 72. Each cable 20 is secured against withdrawl from the case by means of a suitable fastener or even singly by a knot (not shown) on the cable within the case 42.

A voltage-measuring device including the D'Arsonval galvanometer 30 with its associated internal rectifier (not shown) for A.-C. measurements and a rheostat 32 are connected to the ends of the inner conductors 21 within the case 42.

A control knob 70 mounted at the front of the case is employed to open and close a switch 72 and also to adjust the amount of resistance which the rheostat 32 inserts in the circuit in series with the galvanometer 30.

In operation the meter pointer is initially set to zero by screw 34 which mechanically moves the pointer with respect to the scale. The plug 48 is then inserted and control knob 70 is turned to its on position and employed to adjust the rheostat 32. This rheostat is adjusted while the probes 60 and 62 are separated to bring the pointer of the galvanometer 30 to its full-scale position. This reading corresponds to infinite impedance.

With the zero point and full scale points so established, the impedance between two points of a circuit to which the probes 60 and 62 are applied is then indicated by the position of the pointer 32 on the previously calibrated scale 36 of the meter 30.

In a specific embodiment of the invention, a 100 microamp. A.-C. galvanometer having an internal resistance of about 1,000 to 3,000 ohms is employed and the rheostat 32 has a maximum resistance of 5,000 ohms. Thus, the impedance of the voltage measuring portion of the instrument is very large compared to any impedance which is to be measured, particularly in continuity testing. The voltage ratio between the primary and secondary windings is so established that in normal operation and with the probes 60 and 62 not connected to any circuit, the voltage across the secondary winding is approximately 0.5 volt and with the two probes connected together the current in the secondary winding is approximately 25 amps.

The impedance of the secondary winding S and the leads formed by the external conductors 22 is made very low, such as 1 ohm, so that accurate readings of low resistances or impedances may be made. Note that the inner leads 21 connect directly to the probes so that the galvanometer measures only the voltage drop between the probes. Thus, when the test probes are connected to an external circuit, the impedance of which is less than about one ohm, the voltage induced in the secondary winding S of the transformer is divided between the external impedance of the external circuit across which the probes are connected and the internal impedance of the internal circuit which consists in part of the resistance of the external conductors 22 and in part by the impedance of the secondary winding S. Thus, when the external impedance is equal to the internal impedance, half of the open circuit voltage appears across the galvanometer circuit thereby producing a mid-scale reading and when the test probes are shorted together or are connected to points between which there is very little resistance, a very low voltage results causing a very low current flow through the meter 30 indicating an extremely low impedance.

The use of a current step-up transformer makes it possible to employ as a source of current for the probes, a secondary winding which has a very low effective impedance, thereby making it possible to produce a mid-scale reading that corresponds to a very low impedance, such as one-thirtieth ohm. Furthermore, the use of a current step-up transformer makes it possible to supply a very low voltage to the external circuit.

Since the test leads are part of the measured circuit as previously described, test leads 20 of predetermined length are employed in making a series of instruments.

From the foregoing description, it is apparent that an improved continuity meter has been provided which is not only reliable in operation, but is of simple, low cost construction.

Though the invention has been described with reference to only one embodiment thereof, it will now be obvious to those skilled in the art that it may be embodied in other forms without departing from the invention. It is, therefore, to be understood that changes may be made in the material, form and construction of various elements employed in the invention without departing from the invention as defined by the following claim.

I claim:

An instrument for measuring low impedances, comprising, in combination: a transformer having primary and secondary windings adapted to step down a source of alternating voltage to a given value available at said secondary winding; first and second current conductors having probe members connected to one set of their ends respectively and having their other ends connected directly to said secondary winding so that alternating current is available at said probe members, said secondary winding having a low impedance; first and second measuring conductors passing to the probe members and insulated from said current conductors throughout their length up to said probe members, one set of ends of said measuring conductors being connected directly to said probe members respectively; and an A.-C. voltage indicating device, the other ends of said measuring conductors being connected across said voltage indicating device whereby relatively small impedance values across which said probe members are applied may be detected.

References Cited in the file of this patent

UNITED STATES PATENTS

| | | |
|---|---|---|
| 2,188,588 | Antranikian | Jan. 30, 1940 |
| 2,569,098 | Hendricks et al. | Sept. 25, 1951 |